April 18, 1944.  W. ELLIOTT  2,347,091
PLANTING MECHANISM
Filed Feb. 16, 1942  2 Sheets-Sheet 1

INVENTOR.
William Elliott
BY Frederick E. Lange
ATTORNEY.

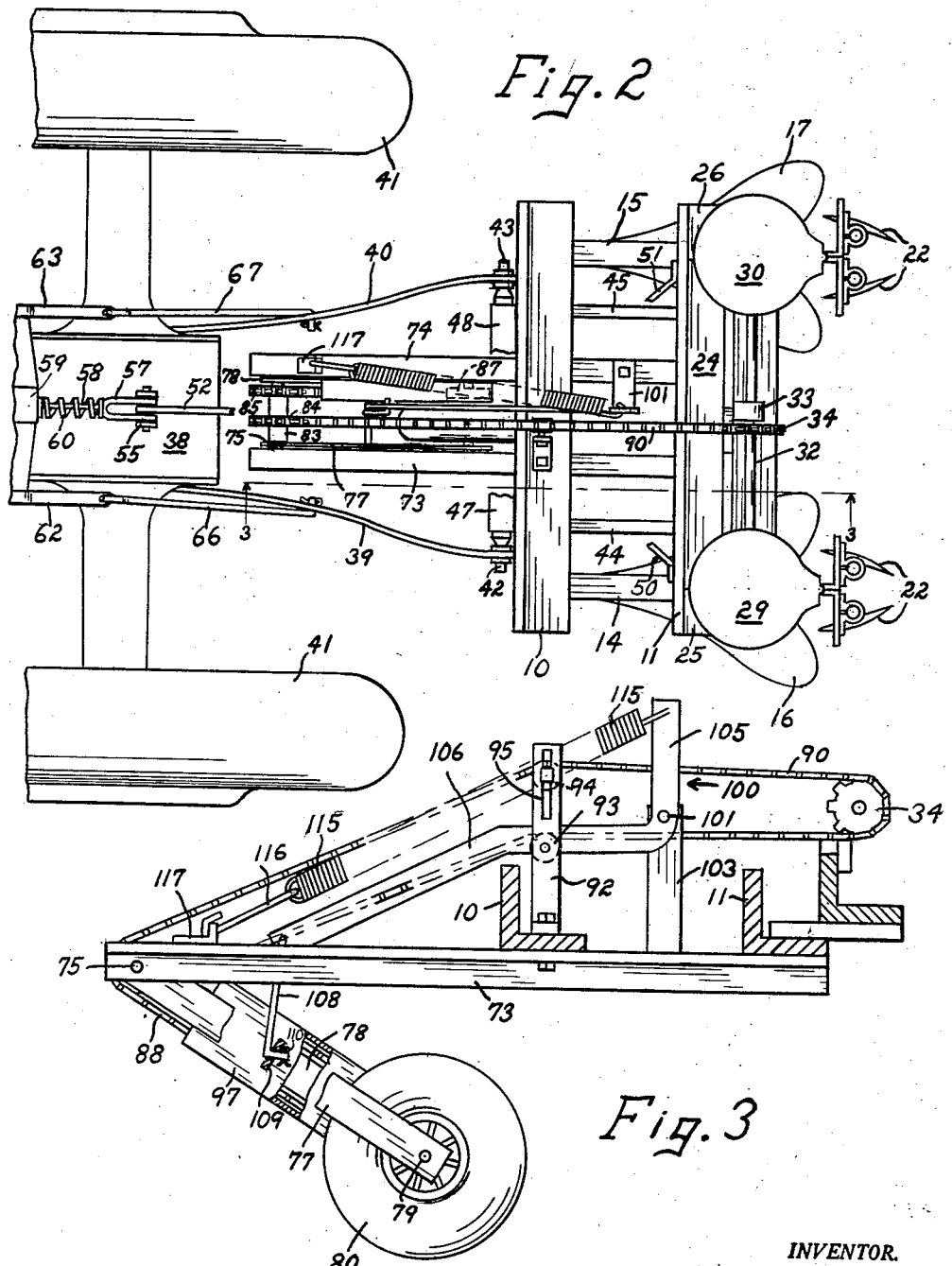

Patented Apr. 18, 1944

2,347,091

UNITED STATES PATENT OFFICE 2,347,091

PLANTING MECHANISM

William Elliott, Beatrice, Nebr., assignor to Dempster Mill Manufacturing Company, Beatrice, Nebr., a corporation of Nebraska Application February 16, 1942, Serial No. 431,025

5 Claims. (Cl. 111—52)

The present invention is concerned with a planting mechanism and more particularly with means in such a mechanism for driving a seed dispensing hopper.

It has been quite common in connection with planting mechanisms to employ a ground wheel for driving the seed dispensing hopper. It is desirable that such a ground wheel engage the ground with a relatively uniform force. If the force is too great, there will be a tendency for the ground wheel to raise the plow out of the ground. If, on the other hand, the ground wheel does not engage the ground firmly enough, it is apt to fail to drive the seed dispensing hopper at certain points. In order to secure as uniform a force as possible, it has been common practice to extend the ground wheel a substantial distance to the rear of the planting units. This has the disadvantage that the wheel travels on plowed ground. Also, such a trailing wheel adds considerable to the length of the planting mechanism and results in it being much less compact than otherwise.

An object of the invention is to provide an improved planting mechanism of the type in which the ground wheel is located ahead of the plow so that it travels on unplowed ground.

A still further object of the invention is to provide an arrangement by which a relatively uniform spring tension is maintained on the ground wheel so as to hold it at a uniform pressure in engagement with the ground over a wide range of vertical positions.

A still further object of the invention is to provide an arrangement of the type described in which the movement of the ground wheel downwardly with respect to the rest of the planting apparatus is limited so that upon the planting apparatus being raised, the ground wheel is also raised.

A still further object of the invention is to provide such a planting mechanism in the form of an attachment adapted to be connected to a tractor having means for raising and lowering the attachment automatically to maintain the plow at the proper depth.

Other objects of the invention will be apparent from a consideration of the accompanying specification, claims, and drawings, of which:

Figure 2 is a plan view of the tractor and planting mechanism; and

Figure 3 is an elevational view on a larger scale showing the mechanism for driving the seed dispensing hoppers, parts being shown in section with the section taken along the line 3—3 of Figure 2.

Figure 1:
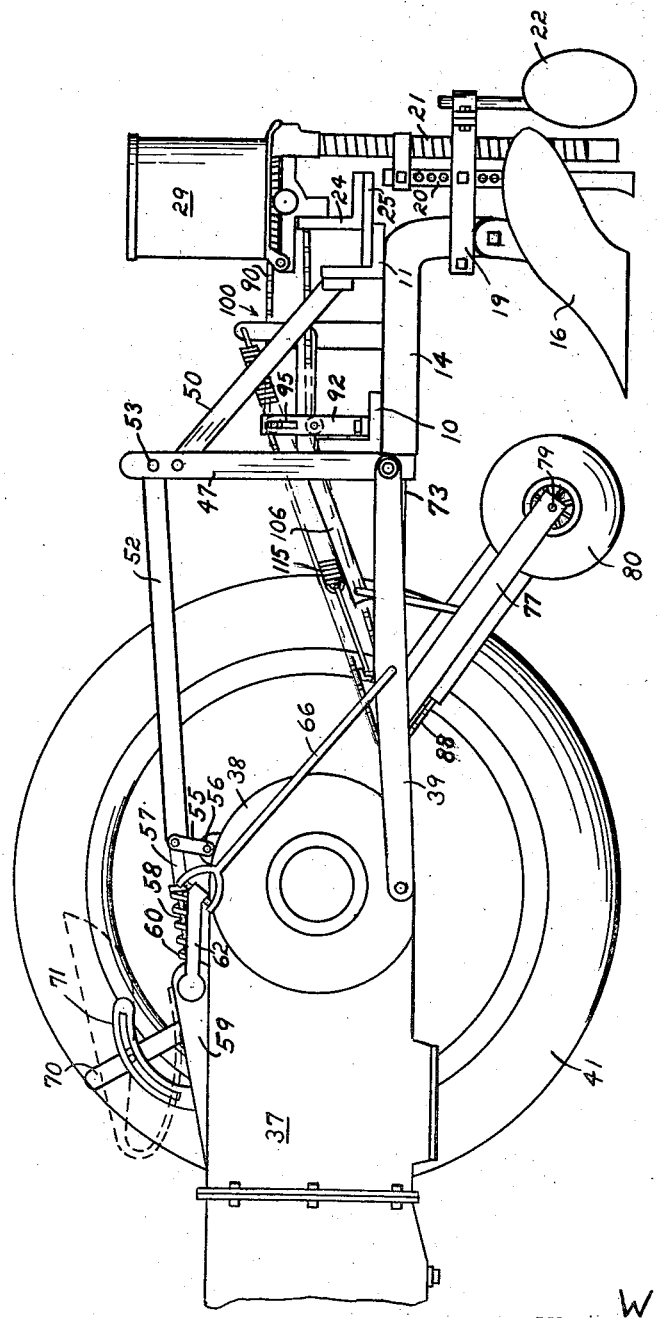
Figure 1 is an elevational view of a portion of a tractor and a two-row planting mechanism employing the features of my invention.

Referring specifically to the drawings for a more detailed understanding of the invention, the planting mechanism is shown as secured to a pair of transverse beams 10 and 11 of angle iron construction. Extending between these transverse beams 10 and 11 are a pair of plow beams 14 and 15. The beams 10 and 11, and 14 and 15 are suitably secured together by bolts or other fastening means. At the lower ends of beams 14 and 15 are secured middle breaker plow bottoms 16 and 17. Secured to the vertically extending portions of each of plow beams 14 and 15 are a pair of opposed, horizontally extending clamping strips 19. These clamping strips 19 serve to position subsoilers 20, the lower ends of seed tubes 21, and covering disks 22. The manner in which these last named elements are secured together is entirely conventional and forms no part of the present invention.

Secured to the transverse angle iron beam 11 is a beam 24, also of angle iron construction. This beam is secured by means of a pair of horizontal plates 25 and 26 which are secured to both beams 11 and 24 and serve to hold them at the relative positions shown in the drawings. The beam 24 is employed to support seed dispensing hoppers and part of the driving mechanism for them. The seed dispensing hoppers are indicated by the reference numerals 29 and 30. These hoppers are of conventional form and serve in the usual manner to discharge seeds through the seed tubes 21. The hopper mechanisms are driven by a drive shaft 32 journalled in a bearing bracket 33. A sprocket wheel 34 is secured to shaft 32 and serves to drive the shaft. It is in the mechanism for driving sprocket 34 and the elements of the planting mechanism associated therewith that my invention resides. This mechanism will be discussed in a later portion of the specification.

The planting mechanism shown in the drawings is designed to be employed in connection with a tractor which has power means for raising and lowering the planting mechanism. The planting mechanism is intended to function as an attachment forming a unitary part of the tractor as distinguished from a trailing implement.

The tractor to which the planting attachment is connected is provided with a central housing portion 37, including a transmission housing 38, and with rear wheels 41. The tractor of the type which I have shown is provided with hydraulically operated means for raising and lowering the implement and automatically adjusting the depth in accordance with a predetermined setting. This mechanism may be of the type shown in the Ferguson Patent No. 2,118,180 of May 24, 1938. Pivotally secured to the tractor are a pair of links 39 and 40. These links have their rear ends secured over pins 42 and 43 carried by brackets secured to beams 10 and 11 by longitudinal beams 44 and 45. The links 39 and 40 act as the traction links.

Extending upwardly from pins 42 and 43 are a pair of bracket members 47 and 48. These bracket members converge towards each other and at their upper ends are clamped together against the upper forward ends of brace members 50 and 51. The rear ends of brace members 50 and 51 are secured to the upstanding flange of angle iron 11. The uppermost ends of bracket members 47 and 48 are spaced apart to form a yoke. A link 52 is pivotally secured in this yoke by means of pivot pin 53. The forwardmost end of link 52 is secured to a yoke member 55 pivotally secured to the tractor body at 56. A further yoke member 57 is pivotally connected to yoke 55 and to link 52. The yoke member 57 is provided with a stem 58 extending into a housing 59 projecting upwardly from the main tractor housing 37. A spring 60 is interposed between yoke 57 and housing 59 and serves to bias yoke 57 and consequently link 52 to the right (as viewed in Figures 1 and 2).

A pair of crank arms 62 and 63 is secured to a shaft extending through a housing 59 and operated by a piston within the housing 59. The crank arms 62 and 63 are connected by links 66 and 67 to links 39 and 40. It will be obvious that upon links 62 and 63 being rotated in a counter-clockwise direction, the links 39 and 40 will be similarly rotated so as to lift the planting attachment away from the ground. The piston, which operates crank arms 62 and 63, is supplied with oil under pressure by means of a pump (not shown). This pumps oil from the crank case against this piston under the control of a pilot valve on the inlet side of the pump. The operation of the pilot valve is controlled by the stem 58 and by the position of a lever 70 associated with an arcuate guiding member 71. As explained more fully in the aforesaid Ferguson patent, for any given position of lever 70, the planting mechanism is caused to assume a depth dependent upon the pressure exerted on spring 58. This serves to automatically regulate the depth of the plows 16 and 17 regardless of variations in ground level. Because of this automatic control of the planting mechanism, it will be noted that the planting mechanism in effect forms a unit with the tractor and no part of the weight of the planting mechanism is carried by wheels associated with the planting mechanism. Thus, it becomes necessary to provide a ground wheel for driving the seed dispensing hoppers 29 and 30. The novel arrangement of the ground wheel and the mechanism associated therewith will now be described.

Secured to the transverse beams 10 and 11 are two longitudinally extending beams 73 and 74. These beams, which constitute a pair of forwardly extending arms, may be formed of angle irons and can be secured to the transverse beams 10 and 11 in any suitable manner such as by being bolted thereto.

A shaft 75 is secured between the forward ends of the beams 73 and 74. Journalled to this shaft are a pair of arms 77 and 78. An axle 79 extends between the lower ends of the arms 77 and 78. A rubber tired wheel 80 is journalled on the axle 79. This wheel constitutes the ground wheel and is operatively connected to the sprocket 34 to drive the hoppers 29 and 30, as will be presently explained.

Journalled on the shaft 75 is a sleeve 83 carrying a pair of sprockets 84 and 85. The sprockets 84 and 85 are rigidly secured to sleeve 83 so as to revolve in unison. A sprocket wheel 87 is journalled on axle 79 and is secured with respect to wheel 80 so as to turn with wheel 80. A sprocket chain 88 extends between sprocket wheels 85 and 87 so that as wheel 80 is rotated, the sprocket wheel 85, the sleeve 83, and the sprocket wheel 84 are rotated.

A second sprocket chain 90 extends between sprocket wheels 34 and 84 so that the movement of sprocket wheel 84 is imparted to sprocket wheel 34 to operate the seed hoppers 29 and 30. Since the angular position of arms 77 and 78 in no way affects the required length of either sprocket chain, it is unnecessary to provide any means for maintaining a constant tension on the sprocket chains. I do, however, provide a chain guiding and tightening means. This comprises an upright bracket 92 which is secured to beam 10. Secured to bracket 92 are two idler sprocket wheels 93 and 94 to support the lower and upper runs of the sprocket chain. The upper idler 94 is secured by means of a bolt extending through a slot 95. Because of this bolt and slot arrangement, the vertical position of the idler 94 can be readily adjusted to compensate for wear in the chain.

In order to guard against the lower chain 88 becoming entangled with weeds and other obstructions, a tubular casing 97 of rectangular cross section is secured to arm 78 and encloses the entire lower portion of chain 88 as well as the sprocket wheel 87. Because of this housing, it is almost impossible for weeds or other matter to become entangled with chain 88.

I will now discuss the novel means I employ for maintaining the ground wheel firmly in engagement with the ground regardless of the depth of the plows. A bell crank lever 100 is pivotally secured at 101 to a bracket 103 secured to the beam 74. The bell crank lever 100 is provided with a relatively short arm 105, extending substantially vertically, and a relatively long arm 106. The right hand portion of arm 106, when wheel 80 is in the position shown in Figure 3, extends substantially horizontally and the left hand portion of arm 106 extends at a slight angle to the horizontal. It is to be understood, however, that the position of wheel 80 shown in Figure 3 is close to the lowermost possible position of the wheel so that when the device is normally in use, arm 106 tends to extend in a generally horizontal direction. The expression "generally horizontal" is obviously intended to be somewhat broad and is intended merely to distinguish from an arrangement in which the long arm extends in a direction closer to the vertical than to the horizontal. The left hand end of arm 106 is pivotally connected to a rod 108. The lower end of rod 108 is bent at right angles and extends through an opening in a cross bar 109 extending between arms 77 and 78. A cotter pin 110 or other fastening means extends through the lower end of arm 108 to retain it in position.

A coil spring 115 is fastened at its right hand end to the upper end of arm 105. The lower left hand end of coil spring 115 is connected to a link 116 which in turn is connected to a bracket 117 secured to beam 74. The spring 115 is capable of exerting considerable tension. In one particular embodiment of my invention, a spring requiring a tension of three hundred pounds to extend it is employed. It is to be noted that the tendency of spring 115 is to rotate arm 105 in a counter-clockwise direction so as to bias arms 77 and 78 clockwise and hence move wheel 80 downwardly into engagement with the ground. Due to the fact that the spring 115 operates a relatively short distance from the pivot pin 101 as compared with the point of connection of link 108, the spring is only extended a short distance during the movement of the lever over its entire range of movement. As a result, the pressure exerted on the ground by wheel 80 remains relatively uniform.

It will be noted that if wheel 80 is lowered a slight distance beyond the position shown in Figure 3, the lower edge of arm 106 of lever 100 will engage the upper edge of the vertical flange of beam 10. This engagement terminates the downward movement of wheel 80 and hence determines the lowermost position wheel 80 can occupy. It is very important that this downward movement be limited so that when the frame is raised upwardly to the point where the plows are withdrawn from the ground, the wheel 80 will also clear the ground.

It will be seen that I have provided an extremely compact planting mechanism in which the ground wheel is disposed in the forward part of the planting mechanism and in which provision is made for insuring that it at all times engages the ground with a relatively uniform pressure.

While I have shown a certain specific embodiment of my invention, it is to be understood that this is for purposes of illustration and that my invention is to be limited only by the scope of the appended claims.

What I claim is:

1. In a planting mechanism comprising a frame adapted to be raised and lowered, the combination of planting units mounted on the rear of said frame and comprising a seed dispensing hopper, said frame comprising an arm extending forwardly from the main portion of said frame, a second arm pivoted to said first arm and extending downwardly and rearwardly, a ground wheel on the end of said second arm, driving connections between said wheel and said seed dispensing hopper, a bell crank lever pivotally secured to said frame, said bell crank lever having a long arm connected at its forward free end to said second arm and extending in a generally horizontal direction, said bell crank lever also comprising a relatively short arm extending in a generally vertical direction, and yieldable biasing means acting on the end of said short arm to bias said ground wheel downwardly.

2. In a planting mechanism comprising a frame adapted to be raised and lowered, the combination of planting units mounted on the rear of said frame and comprising a seed dispensing hopper, an arm pivoted to said frame and extending downwardly, a ground wheel on the end of said arm, driving connections between said wheel and said seed dispensing hopper, a bell crank lever pivotally secured to said frame, said bell crank lever having a long arm connected at its free end to said previously named arm and extending in a generally horizontal direction, said bell crank lever also comprising a relatively short arm extending in a generally vertical direction, and yieldable biasing means acting on the end of said short arm to bias said ground wheel downwardly.

3. In a planting mechanism comprising a frame adapted to be raised and lowered, the combination of planting units mounted on the rear of said frame and comprising a seed dispensing hopper, a pair of arms extending downwardly, a ground wheel journalled between the lower ends of said arms, driving connections between said wheel and said seed dispensing hopper, a bell crank lever pivotally secured to said frame, said bell crank lever having a long arm connected at its free end to said pair of arms and extending in a generally horizontal direction, said bell crank lever also comprising a relatively short arm extending in a generally vertical direction, and yieldable biasing means acting on the end of said short arm to bias said ground wheel downwardly.

4. In a planting mechanism comprising a frame adapted to be raised and lowered, the combination of planting units mounted on the rear of said frame and comprising a seed dispensing hopper, said frame comprising a first pair of arms rigidly secured to and extending forwardly from the main portion of said frame, a shaft secured between the forward ends of said arms, a second pair of arms journalled on said shaft and extending downwardly and rearwardly, a ground wheel journalled between the lower ends of said second pair of arms, driving connections between said wheel and said shaft, said driving connections being disposed between the arms of said second pair, a tubular casing substantially enclosing said driving connections, further driving connections between said shaft and said seed dispensing hopper, a bell crank lever pivotally secured to said frame, said bell crank lever having a long arm connected at its forward free end to said second pair of arms and extending in a generally horizontal direction, said bell crank lever also comprising a relatively short arm extending in a generally vertical direction, and yieldable biasing means acting on the end of said short arm to bias said ground wheel downwardly.

5. In a planting mechanism comprising a frame adapted to be raised and lowered, the combination of planting units mounted on the rear of said frame and comprising a seed dispensing hopper, said frame comprising an arm extending forwardly from the main portion of said frame, a second arm pivoted to said first arm and extending downwardly and rearwardly, a ground wheel on the end of said second arm, driving connections between said wheel and said seed dispensing hopper, a bell crank, a lever pivotally secured to said frame and having a short and a long arm, means connecting the end of said long arm to said second arm, and yieldable biasing means acting on the end of said short arm to bias said ground wheel downwardly, and a stop member mounted on the frame against which the long arm of the bell crank lever engages to limit the downward movement of the ground engaging wheel.

WILLIAM ELLIOTT.